(12) United States Patent
Izumi

(10) Patent No.: US 11,033,995 B2
(45) Date of Patent: Jun. 15, 2021

(54) COOLANT COUPLING DEVICE

(71) Applicants: CITIZEN WATCH CO., LTD., Nishitokyo (JP); CITIZEN MACHINERY CO., LTD., Nagano (JP)

(72) Inventor: Kazuyuki Izumi, Kawagoe (JP)

(73) Assignees: CITIZEN WATCH CO., LTD., Nishitokyo (JP); CITIZEN MACHINERY CO., LTD., Nagano (JP)

(*) Notice: Subject to any disclaimer, the term of this patent is extended or adjusted under 35 U.S.C. 154(b) by 0 days.

(21) Appl. No.: 16/466,764

(22) PCT Filed: Nov. 15, 2017

(86) PCT No.: PCT/JP2017/041155
§ 371 (c)(1),
(2) Date: Jun. 5, 2019

(87) PCT Pub. No.: WO2018/110194
PCT Pub. Date: Jun. 21, 2018

(65) Prior Publication Data
US 2020/0061766 A1 Feb. 27, 2020

(30) Foreign Application Priority Data
Dec. 12, 2016 (JP) .............................. JP2016-240415

(51) Int. Cl.
*B23Q 11/10* (2006.01)
*B23Q 11/12* (2006.01)
(Continued)

(52) U.S. Cl.
CPC ............ *B23Q 11/10* (2013.01); *B23Q 11/122* (2013.01); *B23B 29/242* (2013.01);
(Continued)

(58) Field of Classification Search
CPC ... B23B 2231/24; B23B 29/242; B23B 29/12; B23Q 11/10; B23Q 11/122; B23Q 2220/002
See application file for complete search history.

(56) References Cited

U.S. PATENT DOCUMENTS 5,707,186 A * 1/1998 Gobell .................. B23B 31/302
409/136
6,674,189 B2 * 1/2004 Watanabe .......... B23Q 11/0883
310/52
(Continued)

FOREIGN PATENT DOCUMENTS

CN 102078973 A 6/2011
DE 102015004268 A1 10/2016
(Continued)

OTHER PUBLICATIONS

Machine Translation of IDS provided reference JP 2014-240104 A, pp. 5-9 (Year: 2020).*
(Continued)

*Primary Examiner* — Nicole N Ramos
(74) *Attorney, Agent, or Firm* — Kenja IP Law PC

(57) ABSTRACT

A coolant coupling device (20) includes: a cylinder chamber (25) provided for a support member (2) for a tool rest (4) in a machine tool and supplied with coolant; a piston (P) movably arranged in the cylinder chamber (25); and a coolant supply flow channel (30) provided for the piston (P) for passing coolant therethrough. The piston (P) is driven by the coolant supplied to the cylinder chamber (25) so that an outlet (32) of the coolant supply flow channel (30) is connected to a coolant inlet port (10) of the tool rest (4) to supply the coolant to the tool rest (4). The piston (P) comprises a cylindrical projection (29) protruding toward and into the cylinder chamber (25), and the coolant supply
(Continued)

flow channel (30) has an inlet (34) that opens at an outer peripheral surface of the cylindrical projection (29).

4 Claims, 5 Drawing Sheets

(51) Int. Cl.
*B23B 29/24* (2006.01)
*B24B 55/02* (2006.01)

(52) U.S. Cl.
CPC .... *B23B 2231/24* (2013.01); *B23Q 2220/002* (2013.01); *B24B 55/02* (2013.01)

(56) References Cited

U.S. PATENT DOCUMENTS

| | | | |
|---|---|---|---|
| 7,972,096 B2 * | 7/2011 | Kikkawa | B23Q 1/70 409/136 |
| 2006/0034670 A1 * | 2/2006 | Sugita | B23B 31/265 409/231 |

FOREIGN PATENT DOCUMENTS

| | | |
|---|---|---|
| JP | H0274148 U | 6/1990 |
| JP | H0657502 U | 8/1994 |
| JP | H0657540 U | 8/1994 |
| JP | 2003260627 A | 9/2003 |
| JP | 2014240104 A | 12/2014 |
| TW | 592880 B | 6/2004 |
| TW | 201029777 A1 | 8/2010 |

OTHER PUBLICATIONS

Jun. 18, 2019, International Preliminary Report on Patentability issued in the International Patent Application No. PCT/JP2017/041155.
Jan. 23, 2018, International Search Report issued in the International Patent Application No. PCT/JP2017/041155.
Jun. 18, 2020, the Extended European Search Report issued by the European Patent Office in the corresponding European Patent Application No. 17880289.8.
Sep. 8, 2020, Office Action issued by the China National Intellectual Property Administration in the corresponding Chinese Patent Application No. 201780073819.2.
Sep. 17, 2020, Office Action issued by the Taiwan Intellectual Property Office in the corresponding Taiwanese Patent Application No. 106141331.
Mar. 30, 2021, Office Action issued by the Taiwan Intellectual Property Office in the corresponding Taiwanese Patent Application No. 106141331.
Apr. 16, 2021 Office Action issued by the China National Intellectual Property Admission in the cooresponding Chinese Patent Application No. 201780073819.2

* cited by examiner

COOLANT COUPLING DEVICE

TECHNICAL FIELD

The present disclosure relates to a coolant coupling device for machine tools with a tool rest.

BACKGROUND

In a machine tool such as a numerically controlled lathe, having a tool rest equipped with a plurality of tools, for example, a turret tool rest or a gang tool rest, cutting oil or the like coolant is supplied from the an outlet provided at a tip end of the tool secured to the tool rest or from a nozzle provided in the tool rest, toward the portion of the workpiece to be machined by the tool to thereby cool the portion to be machined.

As a device for supplying coolant from the feeding source to the tool rest that is movably supported on the support table, as disclosed for example in JPH 06-057540 U (PTL 1) or JP 2014-240104 A (PTL 2), a coolant coupling device is known that comprises a piston driven by the pressure of the coolant supplied to the cylinder chamber, wherein the piston is advanced by the pressure of the coolant so that the outlet of the coolant supply flow channel provided in the piston is connected to the inlet port provided in the tool rest of the machine to supply the coolant to the side of the tool rest.

CITATION LIST

Patent Literature

PTL 1 JPH 06-057540 U
PTL 2 JP 2014-240104 A

SUMMARY

Technical Problem

However, the coolant coupling device disclosed in PTL 1 comprises a flow channel in the cylinder that brings the cylinder chamber into fluid communication with the coolant supply flow channel so that the valve member provided in the flow channel is opened to cause flow of the coolant toward the outlet as the tip end of the piston is brought into abutment with the back surface of the tool rest to increase the pressure in the cylinder chamber, thereby requiring a complicated structure that involves a higher production cost.

Further, the coolant coupling device disclosed in PTL 2 is arranged to that the coolant supply flow channel is opened at the pressure receiving surface of the piston toward inside of the cylinder chamber so that a problem arises that the coolant supplied to the cylinder chamber readily flows through the coolant supply flow channel and out of the outlet, thereby making it difficult to increase the pressure in the cylinder chamber, and readily causing leakage of the coolant out of the outlet.

The present disclosure has been conceived in view of the above-mentioned problem. It is an object of the present disclosure to provide a coolant coupling device that prevents leakage of the coolant out of the outlet of the coolant supply flow channel with a simple structure.

Solution to Problem

According to the present disclosure, there is provided a coolant coupling device comprising: a cylinder chamber provided for a support member for a tool rest in a machine tool and supplied with coolant; a piston movably arranged in the cylinder chamber; and a coolant supply flow channel provided for the piston for passing coolant therethrough; wherein the piston is driven by the coolant supplied to the cylinder chamber so that an outlet of the coolant supply flow channel is connected to a coolant inlet port of the tool rest to supply the coolant to the tool rest. The device is characterized in that: the piston comprises a cylindrical projection protruding toward and into the cylinder chamber, and an inlet of the of the coolant supply flow channel opens at an outer peripheral surface of said cylindrical projection.

With the above-mentioned structure of the coolant coupling device according to the present disclosure, it is preferred that the inlet has an opening area that is smaller than an opening area of the outlet.

Advantageous Effect

The present disclosure thus provides a coolant coupling device that prevents leakage of the coolant out of the outlet of the coolant supply flow channel with a simple structure.

DETAILED DESCRIPTION

Figure 1:
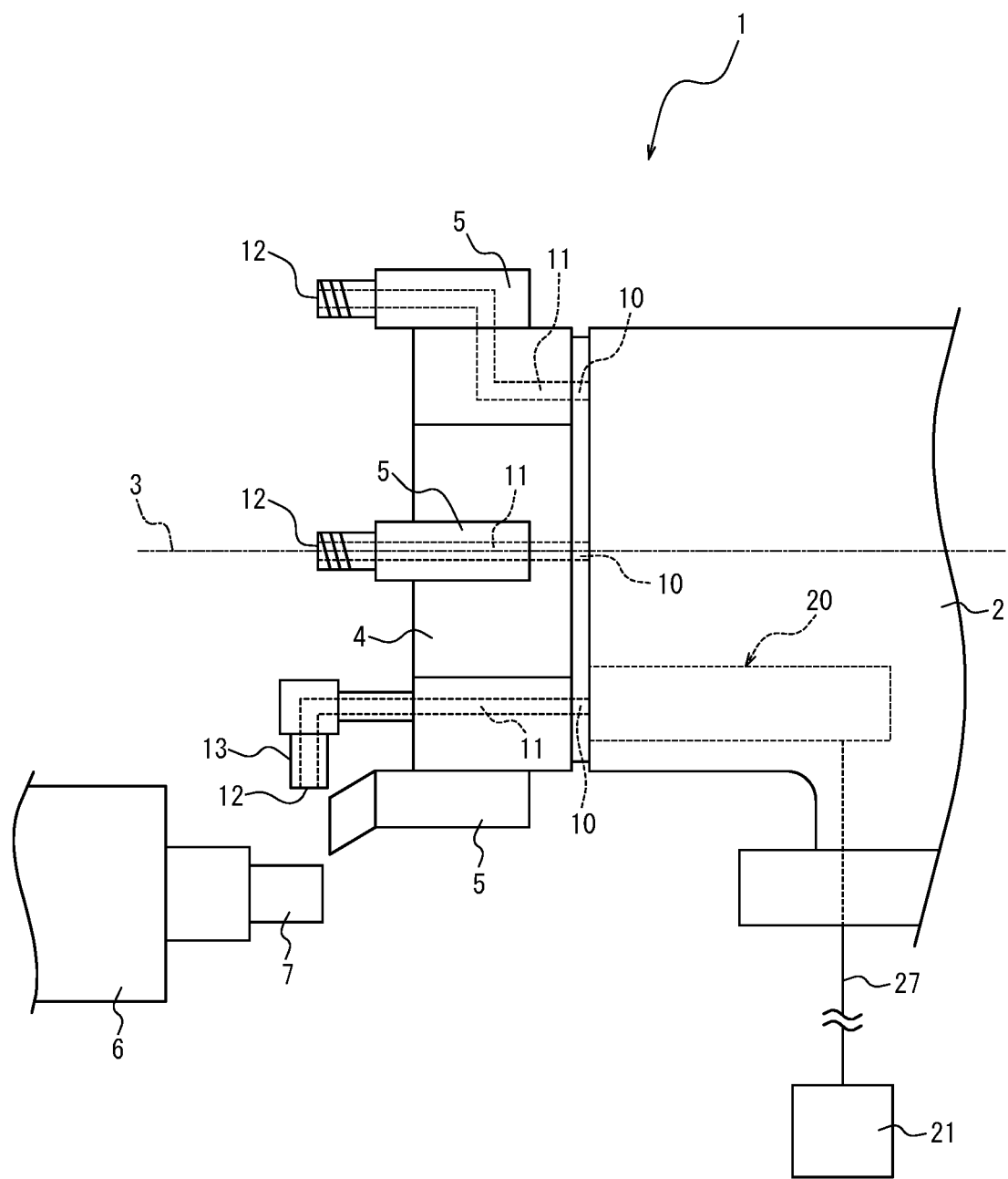
FIG. 1 is a schematic view of a tool rest device with a coolant coupling device according to one embodiment of the present disclosure.

A tool rest device 1 is illustrated in FIG. 1, that forms part of a machine tool in the form of a lathe. The tool rest device 1 includes a turret tool rest 4 that is supported on a support base so as to be rotatable about a rotational center axis 3. The turret tool rest 4 is formed into a substantially disc shape with a predetermined thickness and secured on its outer peripheral surface with a plurality of tools 5 that are arranged side-by-side with a distance in the circumferential direction.

Between the turret tool rest 4 and the support base 2, there is provided a coupling mechanism, which is not illustrated. The turret tool rest 4 is prevented from rotation relative to the support base 2 and thus can be positioned at a predetermined index position corresponding to the respective tool 5. When the turret tool rest 4 is rotated about the rotational center axis 3 in a released state of the coupling mechanism, a desired tool 5 can be positioned at a predetermined index position, so that the tool can be selectively used to perform cutting of the workpiece 7 that is clamped to the main shaft 6.

The coupling mechanism may be comprised of a mechanism wherein the coupling can be engaged or disengaged inside the turret tool rest without axially moving the turret tool rest relative to the support base 2 (e.g., a three-piece coupling), though there may be used a mechanism wherein the coupling can be engaged or disengaged by moving the turret tool rest in a direction away from the support base 2.

The turret tool rest 4 has a back surface opposing to the side of the support base 2 (i.e., the axial end surface), which is provided with a plurality of inlet ports 10 that are arranged side-by-side about the rotational center axis 3 with a distance in the circumferential direction. The inlet ports 10 are each in communication with outlet ports 12 via a communication passage 11. The outlet ports 12 are arranged to open toward the cutting edge of the tool 5, such as a tip end of the tool 5 or a tip end of a nozzle 13 provided for the turret tool rest 4. By supplying coolant, such as cutting oil, to the inlet port 10 that corresponds to the tool 5 for machining, the coolant can be discharged and supplied to the portion of the workpiece 7 to be machined buy the tool 5.

The inlet port 10 corresponding to the tool 5 to be used for machining is connected to a coolant supply source 21 through a coolant coupling device 20 according to one embodiment of the present disclosure.

Figure 2:
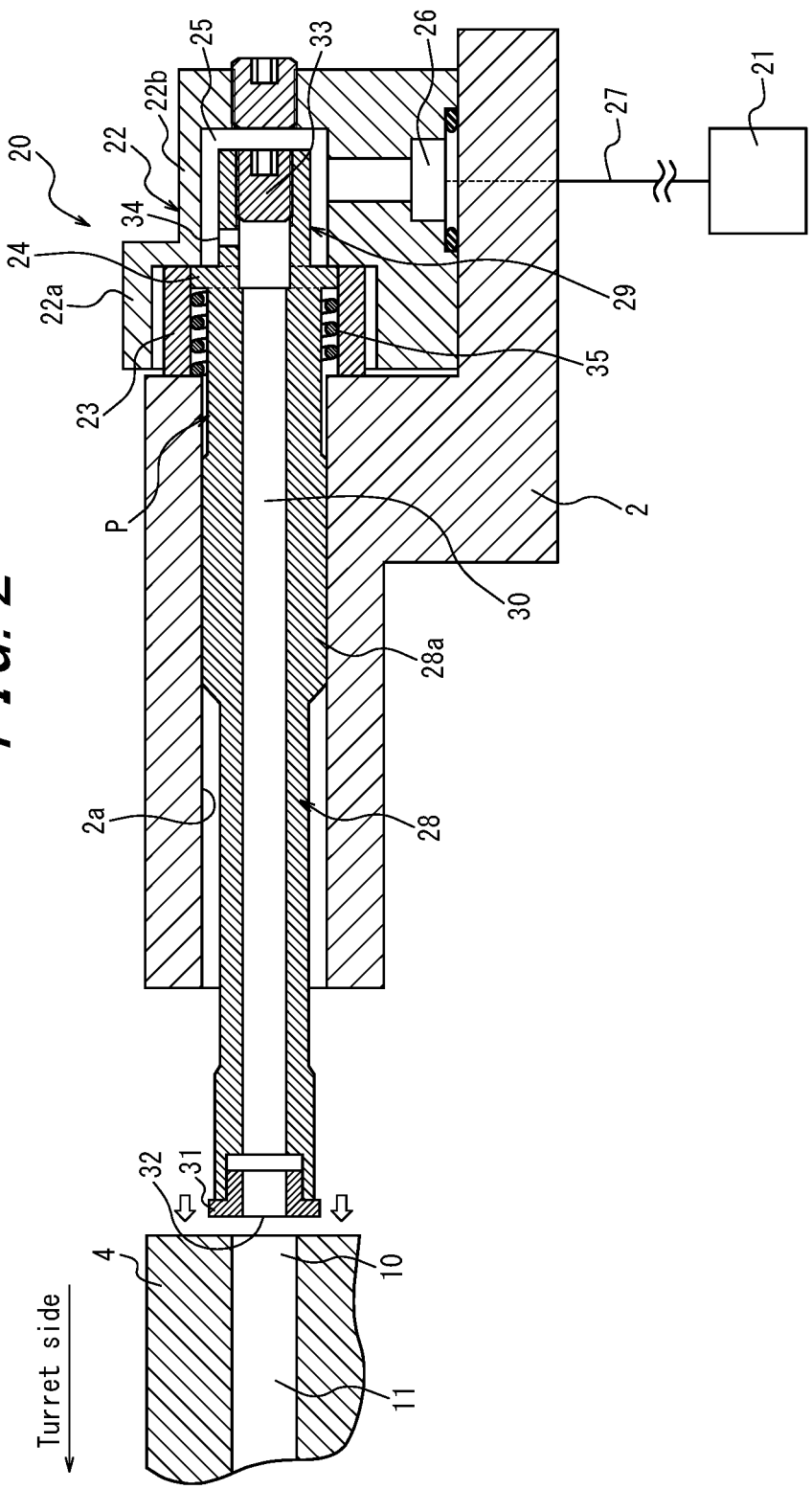
FIG. 2 is a sectional view illustrating the detail of the coolant coupling device illustrated in FIG. 1.

As illustrated in FIG. 2, the coolant coupling device 20 has a cylinder block 22 that is fixedly secured to the support base 2. The cylinder block 22 includes a large diameter portion 22a having a cylindrical inner surface, and a small diameter portion 22b smaller in diameter than the large diameter portion 22a and having a cylindrical surface. The large diameter portion 22a is provided on its inner side with a collar 23. The collar 23 is formed into a cylindrical shape that is larger in diameter than the inner surface of the small diameter portion 22b, and arranged coaxially to the inner surface of the large diameter portion 22a so as to be clamped between the cylinder block 22 and the support base 2 with a seal member therebetween, such as an O-ring or a sealant.

On the inner side of the collar 23, a disc-like piston body 24 is arranged so as to be slidable along the inner peripheral surface of the collar 23. The piston body 24 is accommodated inside of a cylinder chamber 25 that is defined within the cylinder block 22. The cylinder chamber 25 is connected to the coolant supply source 21 via a pipe 27 connected to a supply port 26 provided in the cylinder bloc 22 and adapted to be supplied with coolant from the supply source 21. When the coolant is supplied from the supply source 21 to the inside of the cylinder chamber 25 via the pipe 27, the piston body 24 is driven be the pressure of the coolant supplied to inside of the cylinder chamber 25, and advanced toward the side of the turret tool rest 24.

The piston body 24 has a surface facing toward the side of the turret tool rest 4, which is integrally provided with a pipe portion 28, and the piston body 24 and the pipe portion 28 constitute a piston P. The pipe portion 28 is arranged coaxially with the piston body 24 and extends from the piston body 24 toward the turret tool rest 4, and is slidably supported along the inner peripheral surface of the support hole 2a formed in the support base 2 at the outer peripheral surface of a large diameter portion 28a so as to be movable toward and away from the turret tool rest 4.

The piston body 24 has a further surface facing opposite to the turret tool rest 4, which is integrally provided with a cylindrical projection 29. The cylindrical projection 29 is formed coaxially to the piston body 24 and projects from the piston body 24 toward inside the cylinder chamber 25.

The piston P is provided with a coolant supply flow channel 30 along the center axis. The coolant supply flow channel 30 extends from the piston body 24 to the tip end of the pipe portion 24. The tip end of the pipe portion 28 is fitted with a slide bearing 31 formed of a resin material into a cylindrical shape having a flange. The coolant supply flow channel 30 extends into inside of the slide bearing 31, and the slide bearing 31 has an open end that constitutes an outlet port 32 of the coolant supply flow channel 30.

The coolant supply flow channel 24 also extends from the piston body 24 into inside of the cylindrical projection 29. The cylindrical projection 29 has an end portion fitted with a plug 33, which serves to close the end portion of the coolant supply flow channel 30.

The cylindrical projection 29 is provided with an inlet 34 of the coolant supply flow channel 30, which serves to communicate inside of the cylinder chamber 25 with the coolant supply flow channel 30. The coolant supply flow channel 30 extends in a direction that intersects with the axial direction of the pipe portion 28 on the side of the cylindrical projection 29, i.e., in a direction intersecting the moving direction of the piston P. In the present embodiment, the coolant supply flow channel 30 at the end on the side of the cylindrical projection 29 extends in a direction perpendicular to the axial direction of the pipe portion 28. The inlet 34 has an opening area that is smaller than the opening area of the outlet 32.

A spring member 35 is arranged between the piston body 24 and the support base 2 so that the piston body 24 is urged by the spring member 35 in a direction away from the turret tool rest 4.

As illustrated in FIG. 2, in a state where the cylinder chamber 25 is not supplied with coolant, the piston P is held by the urging force of the spring member 35 in a retracted position where the piston body 24 abuts with the end surface of the small diameter portion 22a. When the piston P is in the retracted position, the tip end of the slide bearing 31 is spaced from the back surface of the turret tool rest 4. Therefore, even if the coupling mechanism for indexing the turret tool rest 4 is comprised of a mechanism that enables engagement and disengagement of the coupling inside the turret tool rest 4 without moving the turret tool rest 4 in the axial direction, the tip end of the slide bearing 31 is maintained in a position spaced from the back surface of the turret tool rest 4 upon rotation of the turret tool rest 4 for selecting a tool to be used for machining, thereby preventing wear of the slide bearing 31 by avoiding friction of the tip end of the slide bearing 31 with the back surface of the turret tool rest 4.

Figure 3:
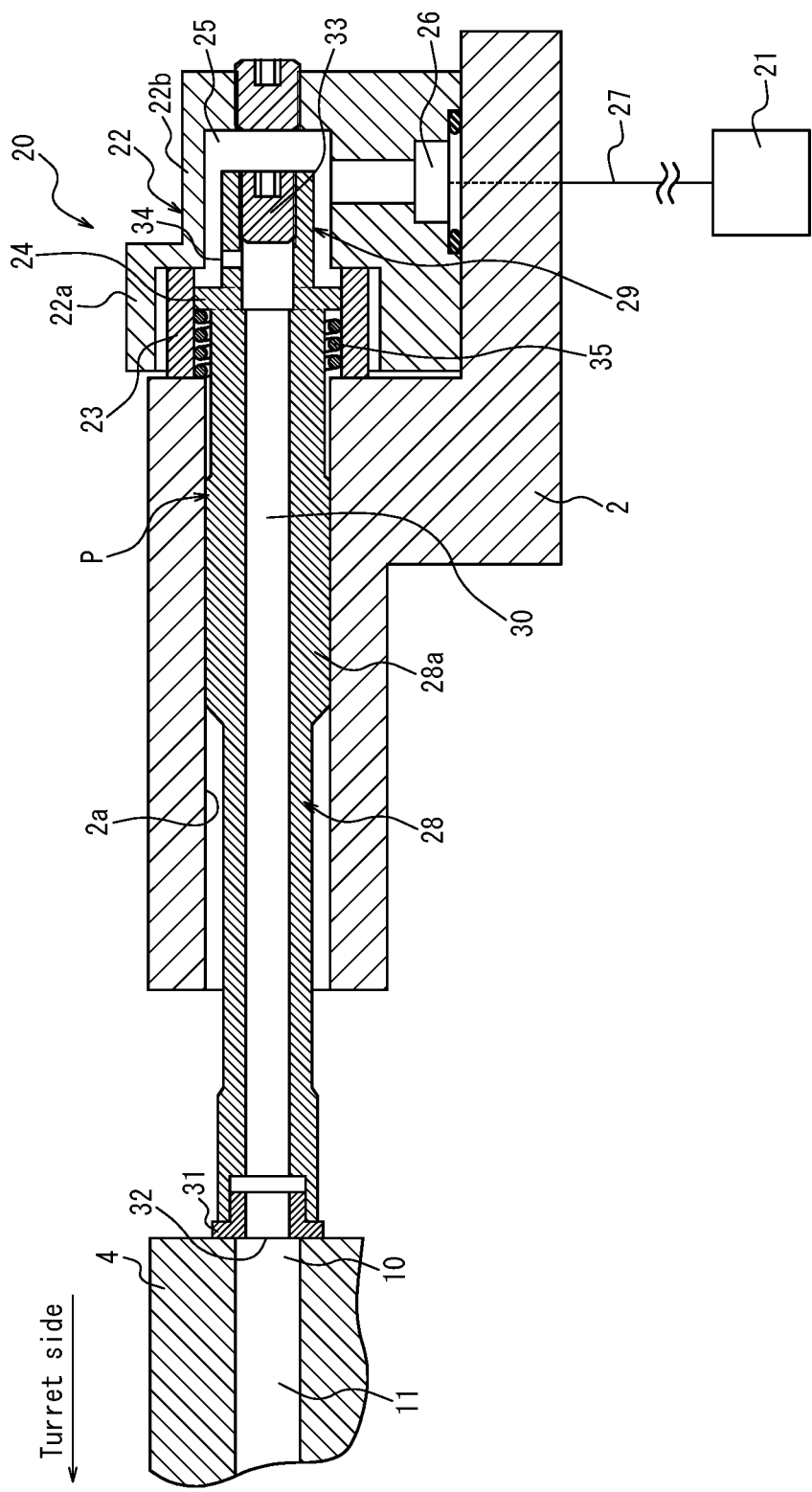
FIG. 3 is a sectional view of the coolant coupling device illustrated in FIG. 2, in its coolant supplying state.

When a tool 5 to be used for machining has been selected and the machining by that tool 5 is performed, the coolant is supplied from the supply source 21 to the outlet port 12. As the supply of the coolant from the supply source 21 is initiated, the piston P is driven by the pressure of the coolant supplied to inside of the cylinder chamber 25, from the retracted position in an extended direction toward the side of the turret tool rest 4, and moved to the extended position where the tip end of the slide bearing 31 is brought into abutment with the back surface of the turret tool rest 4, as illustrated in FIG. 3. When the piston P has moved to the extended position and the tip end of the slide bearing 31 is in abutment with the back surface of the turret tool rest 4, the outlet port 32 of the coolant supply flow channel 30 is connected to the inlet port 10 corresponding to the tool 5 to be used for the machining.

In this instance, since the inlet port for causing the coolant within the cylinder chamber 25 to flow into the coolant supply flow channel 30 is opened to the outer peripheral surface of the cylindrical projection 29, the coolant supplied to the inside of the cylinder chamber 25 is suppressed from flowing into the coolant supply flow channel 30. In the present embodiment, since the opening area of the inlet 34 is smaller than that of the outlet 32, it is possible to ensure that the coolant supplied to inside of the cylinder chamber 25 is suppressed from flowing into the coolant supply flow channel 30.

With the arrangement as described above, in the initial state wherein the coolant from the supply source 21 is supplied to inside of the cylinder chamber 25, by raising the pressure within the cylinder chamber 25 rapidly, it is possible to bring the tip end of the slide bearing 31 into abutment with the back surface of the turret tool rest 4, before the coolant supplied to the inside of the cylinder chamber 25 flows from the inlet port 34 into the coolant supply flow channel 30. Thus, with a simple arrangement wherein the inlet port 34 is opened to the outer peripheral surface of the cylindrical projection 29, it is possible to connect the outlet port 34 with the inlet port 10, without causing leakage of the coolant from the outlet port 32.

When the piston P moves to the extended position and the tip end of the slide bearing 31 is brought into abutment with the back surface of the turret tool rest 4, the pressure within the cylinder chamber 25 is further increased, so that the coolant within the cylinder chamber 25 flows into the coolant supply flow channel 30 and supplied from the outlet port 32 to the inlet port 10. The coolant supplied to the inlet port 10 reaches the outlet port 12, through the communication passage 11, and is discharge from the outlet port 12 toward the portion of the workpiece 7 to be machined by the tool 5.

Once machining of the workpiece 7 by means of the tool 5 has been completed and the supply of the coolant from the supply source 21 is stopped, the pressure in the cylinder chamber 25 is reduced and the piston P is returned to its retracted position (FIG. 2) by the urging force of the spring member 35. When the piston P is returned to its retracted position, the tip end of the slide bearing 31 is moved away from the back surface of the turret tool rest 4 so that the turret tool rest 4 can be rotated for selecting a tool 5 to be used for a next machining, without contact of the tip end of the slide bearing 31 with the back surface of the turret tool rest 4

Figure 4:
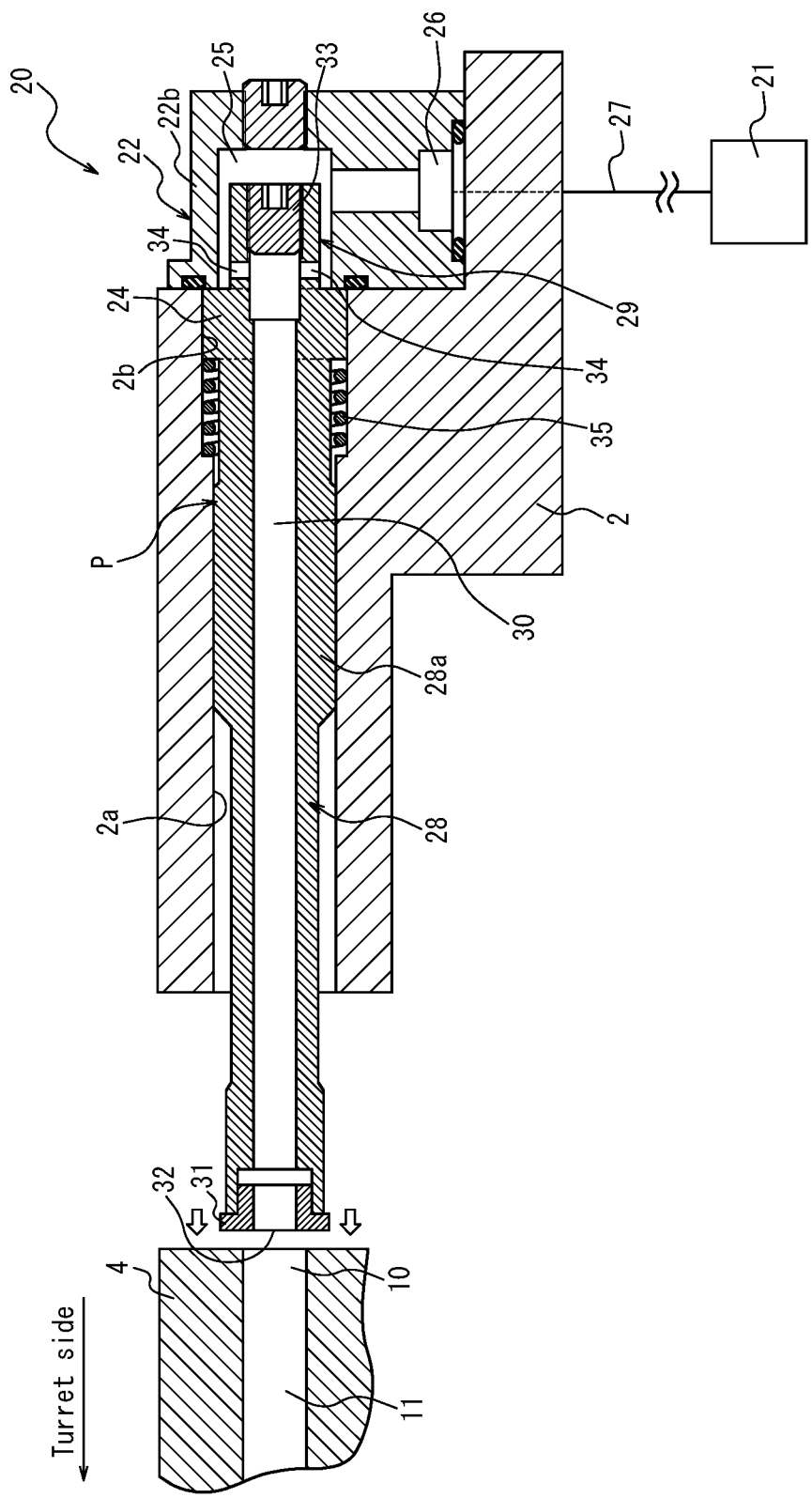
FIG. 4 is a schematic view illustrating a variation of the coolant coupling device illustrated in FIGS. 2 and 3.

FIG. 4 is a schematic view illustrating a variation of the coolant coupling device illustrated in FIGS. 2 and 3. In FIG. 4, the elements corresponding to those described above are denoted by the same reference numerals.

The coolant coupling device as illustrated in FIGS. 2 and 3 is configured so that the cylinder chamber 25 is defined by the cylinder block 22 having the large diameter portion 22a and the small diameter portion 22b, the cylindrical collar 23 is arranged inside of the large diameter portion 22a of the cylinder block 22, and the piston body 24 is arranged slidably along the inner peripheral surface of the collar 23. In contrast, according to the variation as illustrated in FIG. 4, the portion corresponding to the collar 23 is integrally formed on the support base 2, and the piston body 24 is arranged slidably along the inner peripheral surface of that cylindrical portion 2b of the support base 2. The cylinder block 2 has a shape provided only with the small diameter portion 22b, but not with the large diameter portion 22a, and the cylinder block 2 is fixedly secured to the support base 2 so as to define the cylinder chamber 25, together with the cylindrical portion 2b of the support base 2. The piston body 24A is integrally provided with a cylindrical projection 29, which projects toward the inside of the cylinder chamber 25 and is provided with a pair of inlets 34. With such an arrangement, the piston body 24 can be stably supported by the support base 2 for allowing the piston body 24 to be operated precisely.

Figure 5:
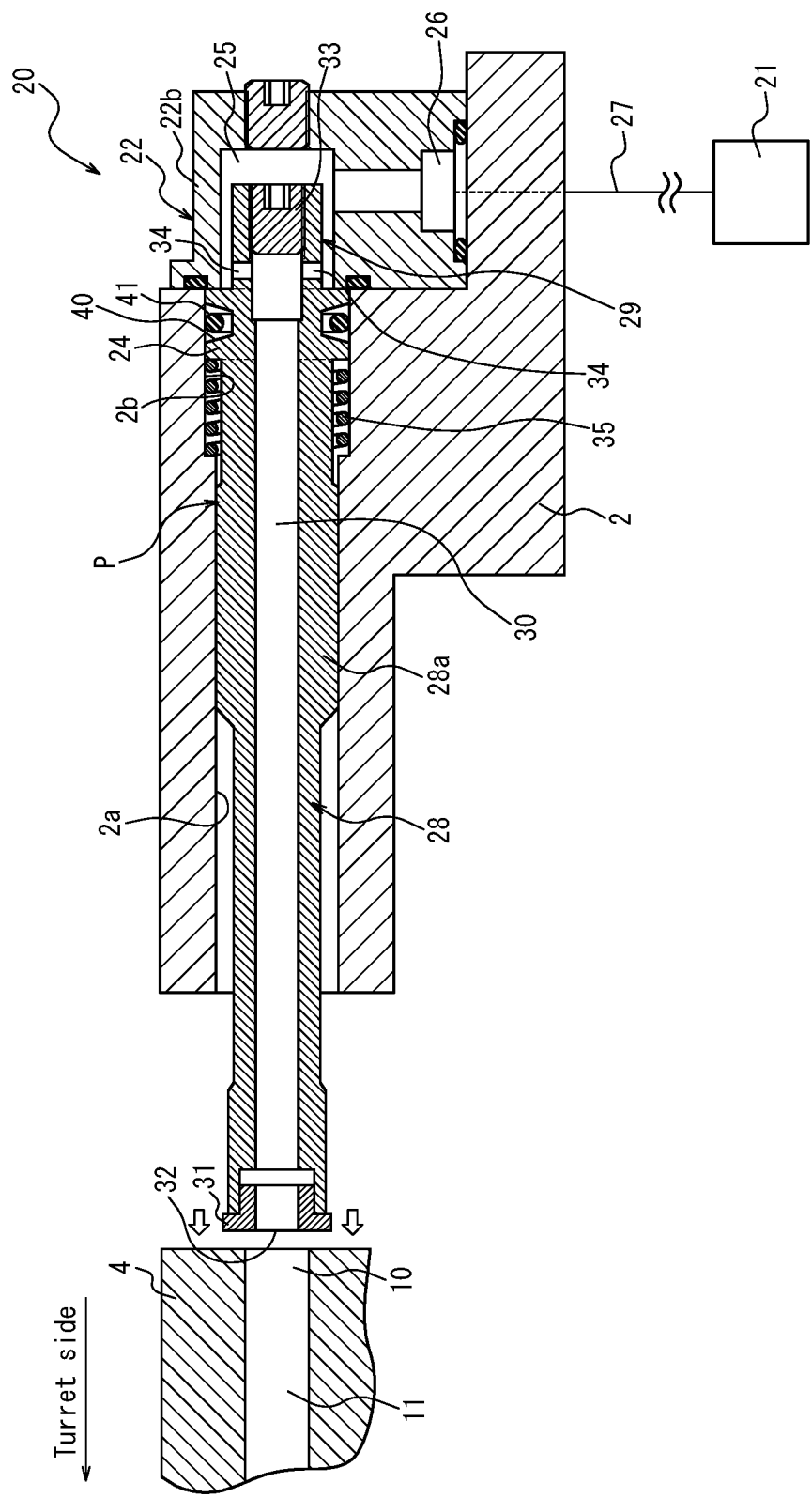
FIG. 5 is a schematic view illustrating a variation of the coolant coupling device illustrated in FIG. 4.

FIG. 5 is a schematic view illustrating a variation of the coolant coupling device 20 illustrated in FIG. 4. In FIG. 4, the elements corresponding to those described above are denoted by the same reference numerals.

It would be desirable for the coolant, which has been supplied to the cylinder chamber 25, to be prevented from passing through the clearance between the outer peripheral surface of the piston body 24 and the inner peripheral surface of the cylindrical portion 2b and leaking to outside from the tip end of the support hole 2a. To this end, the piston body 24 may be provided with a sealing mechanism. As illustrated in FIG. 5, the sealing mechanism may be configured so that the piston body 24 is provided on its outer peripheral surface with an annular groove 40, in which an O-ring 41 is incorporated.

In the illustrated arrangement, the annular groove 40 has an inverted trapezoidal cross-sectional shape with both sidewalls inclining in a tapered manner, and a groove width that is larger in the opening side than in the bottom surface side.

The O-ring 41 is annular and has circular cross-section, with an outer diameter that is determined so that the outer periphery of the O-ring 41 is brought into contact with the inner peripheral surface of the cylindrical portion 2b of the support base 2 and urged with a small sliding resistance. The O-ring 41 has an inner diameter that is larger than the outer diameter of the annular groove 40 at its bottom surface, so that a clearance is provided between the O-ring 41 and the bottom surface of the annular groove 40. The O-ring has a width in the axial direction (i.e., thickness), which is smaller than the groove width at the opening end side of the annular groove 40. Thus, as the coolant is supplied to the cylinder chamber 25 and the piston P moves from the retracted position to the extended position on the side of the turret tool rest 4, the O-ring 41 would not disturb that movement of the piston P.

In the above-mentioned arrangement, when the coolant is supplied to the cylinder chamber 25 and the piston P is moved from the retracted position to the extended position, the piston P is free from sliding resistance that may otherwise be produced by the movement of the O-ring 41, so that the piston P can be moved swiftly to the extended position.

On the other hand, when the piston P reaches the extended position and the coolant supplied to the cylinder chamber 25 passes through the clearance between the O-ring 41 and the bottom surface of the annular groove 40 and flows into the annular groove 40, the O-ring 41 is pushed forward by the pressure of the coolant and urged against the tapered sidewall of the annular groove 40, so that the O-ring 41 is expanded radially outwards by the inclination of the tapered sidewall and is thereby urged against the inner peripheral surface of the cylindrical portion 2b. By this, the clearance between the outer peripheral surface of the piston body 24 and the inner peripheral surface of the cylindrical portion 2b is sealed so as to prevent leakage of the coolant from the tip end of the support hole 2a to outside.

When the supply of coolant to the cylinder chamber 25 is stopped and the piston P is returned to the retracted position by the urging force of the spring member 35, the O-ring 41 is urged against the tapered sidewall of the annular groove 40 and moved to the initial position together with the piston P. On this occasion, the piston can be readily moved since the O-ring 41 has an outer peripheral surface that is brought into contact with the inner peripheral surface of the cylindrical portion 2b and urged with a small sliding resistance. Thus, the piston P can be returned swiftly to the retracted position.

The present disclosure is not limited to the embodiments described above, and can be modified in various manner without departing from the scope of the disclosure.

In the embodiments described above, the tool rest is comprised of a turret tool rest 4 that is rotatably supported by the support base 2. However, various types of tool rest may be used, including a gang tool rest, provided that the tool rest is equipped with a plurality of cutters (tools) and supported by the support base 2 so as to be movable to a plurality of positions corresponding to the respective tools.

In the embodiments described above, the piston body 24 is integrally provided with the elongate pipe portion 28 to form the piston P, and the tip end of the pipe portion 28 is fitted with the slide bearing 31 that is urged against the back surface of the turret tool rest 4. However, the piston P may be configured such that the pipe portion 28 is not provided, and it is directly urged against the back surface of the turret tool rest 4.

In the embodiments described above, the piston P is returned to the retracted position by the urging force of the spring member 35. However, it is possible to use an arrangement in which the spring member 35 is not provided. In this instance, when the piston P moves toward the extended position under vibration or the like upon rotation of the turret tool rest 4, it is possible to prevent wear of the tip end of the pipe portion 28 by fitting a resin slide bearing 31 to the tip end of the pipe portion 28.

REFERENCE SIGNS LIST

1 Tool rest device
2. Support base
2a Support hole
2b Cylindrical portion
3 Rotational center axis
4 Turret tool rest
5 Tool
6 Main shaft
7 Workpiece
10 Inlet port
11 Communication passage
12 Outlet hole
13 Nozzle
20 Coolant coupling device
21 Supply source
22 Cylinder block
22a Large diameter portion
22b Small diameter portion
23 Collar
24 Piston body
25 Cylinder chamber
26 Supply port
27 Pipe
28 Pipe portion
28a Large diameter portion
29 Cylindrical projection
30 Coolant supply flow channel
31 Slide bearing
32 Outlet
33 Plug
34 Inlet
35 Spring member
40 Annular groove
41 O-ring
P Piston

The invention claimed is:

1. A coolant coupling device comprising:
a cylinder chamber provided for a support member for a tool rest in a machine tool and supplied with coolant;
a piston movably arranged in the cylinder chamber; and
a coolant supply flow channel provided for the piston for passing coolant therethrough; wherein said piston is driven by the coolant supplied to the cylinder chamber so that an outlet of the coolant supply flow channel is connected to a coolant inlet port of the tool rest to supply the coolant to the tool rest, characterized in that:
the piston comprises a piston body formed in a disc shape,
a pipe portion integrally provided at one axial end of the piston body facing toward the tool rest and protruding axially to the tool rest, and a cylindrical projection integrally provided at another axial end of the piston body facing opposite to the tool rest and protruding axially opposite to the tool rest toward and into the cylinder chamber,
the pipe portion has a diameter smaller than the piston body, and
the coolant supply flow channel has an inlet that opens at an outer peripheral surface of the cylindrical projection.

2. The coolant coupling device according to claim 1, wherein said inlet has an opening area that is smaller than an opening area of said outlet.

3. The coolant coupling device according to claim 1, further comprising a spring member arranged between the piston and the support member, wherein
the piston is urged by the spring member in a direction away from the tool rest.

4. The coolant coupling device according to claim 2, further comprising a spring member arranged between the piston and the support member, wherein
the piston is urged by the spring member in a direction away from the tool rest.

* * * * *